United States Patent [19]

Hissa

[11] Patent Number: 4,464,836
[45] Date of Patent: Aug. 14, 1984

[54] FRICTION SAW AND HANDLE ASSEMBLY
[76] Inventor: Robert E. Hissa, 9500 SW. 51st Ter., Miami, Fla. 33165
[21] Appl. No.: 418,377
[22] Filed: Sep. 15, 1982
[51] Int. Cl.³ .............................................. B26B 27/00
[52] U.S. Cl. ........................................ 30/92; 30/90.1; 30/166; 16/122
[58] Field of Search ................... 30/92, 94, 95, 90.1, 30/116, 117, 166 R; 16/114 B, 122; 24/115 R

[56] References Cited

U.S. PATENT DOCUMENTS

| 948,109 | 2/1910 | Harrigan | 16/122 X |
| 2,252,359 | 8/1941 | Wade | 16/122 |
| 2,722,209 | 11/1955 | Pillow | 16/122 |
| 3,310,082 | 3/1967 | La Tramerye | 30/166 |
| 4,398,347 | 8/1983 | Duffy | 30/90.1 |

FOREIGN PATENT DOCUMENTS 629925  9/1949  United Kingdom ............... 30/116

Primary Examiner—Jimmy C. Peters
Attorney, Agent, or Firm—Harvey B. Jacobson

[57] ABSTRACT

A friction saw including a Nylon textile cord of a given length anchored to handle elements in the form of molded elongated bodies, at least one of which has a radial slot through which one end portion of the Nylon cord is assembled or disassembled. A resilient clip enclosing the handle locks the cord in place.

3 Claims, 4 Drawing Figures

FRICTION SAW AND HANDLE ASSEMBLY

BACKGROUND OF THE INVENTION

The present invention relates to flexible cutting tools.

Various prior art and U.S. patents relate to such saws and cutting devices and of interest to the present invention are the following U.S. patents:

U.S. Pat. No. 2,282,692, W. C. Athon et al.
U.S. Pat. No. 3,310,082, R. DeLaTramerye
U.S. Pat. No. 2,771,872, C. G. B. Bergling
U.S. Pat. No. 3,651,844, T. B. C. Barnes
U.S. Pat. No. 3,495,590, W. Zeiller
U.S. Pat. No. 3,774,400, W. Frickhofen The patent to Athon et al. discloses a cable which is of metal used for cutting block bituminous materials, such as asphalt, pitch or tar. The patent DeLaTramerye discloses a handle attached to each end of a flexible component consisting of a metal wire having barbs for use as a saw. The patent to Frickhofen discloses a wire-reinforced blade for use as a pocket-saw by foresters and hunters. The patent to Bergling discloses a concrete slab which is cut by sewing wire. The patent to Zeiller discloses a saw for cutting a surgical cast, the saw being embedded in the cast. The patent to Barnes discloses a saw blade illustrated as a continuous wire element.

An object of the present invention is to provide a relatively simple and efficient device for cutting plastic materials and the like and for cutting such materials in obtuse, inaccessible and unobtainable locations.

A further object of the present invention is to provide a frictional saw capable of being gripped for operation and for using the saw in generally inaccessible locations.

SUMMARY OF THE INVENTION

In accordance with the present invention, a lightweight flexible friction saw comprises a piece of Nylon textile cord, line twine or string such as a 1/16" diameter and of a length of approximately 18"-24" adapted to be reciprocated while in contact with a PVC object to be cut which is a thermosetting plastic. The ends of the textile cord terminate in handles, one of which or both of which may be slotted longitudinally for passage of the Nylon cord therethrough. Ends of the Nylon cord terminate in knots at the ends of the handle distal from the cutting portion of the Nylon cord. These handles may be made out of any rigid or semi-rigid materials formed to most comfortably and conveniently be held in the hand. The cord may pass through a washer or similar element interposed between an end of the handle and the knot, and the washer may be of a suitable material and of an appropriate size so as not to allow the Nylon cord to pass back through the handle under tension and pressure. One, or both, of the handles may have a radial slot cut to permit easy removal of the Nylon cord and to allow the Nylon cord to be passed into tight areas such as behind, under or on top of an object to be cut. The Nylon cord may be locked in by a rotatable and slidable clip securely engaging the handle body for preventing the Nylon cord from slipping out of the handle.

A friction saw of the present invention can be used to cut any PVC or other plastic article as long as the object is held semi-rigid, and has the advantage of being able to cut such objects in heretofore inaccessible locations such as a PVC pipe in a tight corner or a PVC pipe in a ditch. The friction saw of the present invention thus replaces a hack saw blade, a hacksaw, or any type of wood saw or metal blade which has been used to cut PVC or plastic. Such hacksaw blade or wood saw blades have required extra work to provide space for use and also the use of a hacksaw to cut PVC has adversely affected the blade making it dull very quickly and producing an uneven sliding cut (not perpendicular to the pipe). A wood saw or hand saw, which produces a cut even and perpendicular to the pipe, is dulled more readily than the hacksaw at much more expense. Further the friction saw can be used to cut plastic insulation or PVC pipe around live electric wires without fear of electrical shock (unless it is in water) and can be used extensively in construction as well for household purposes. Also, saw blade binding is avoided while providing a fast, easy and economical cutting action.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 4:
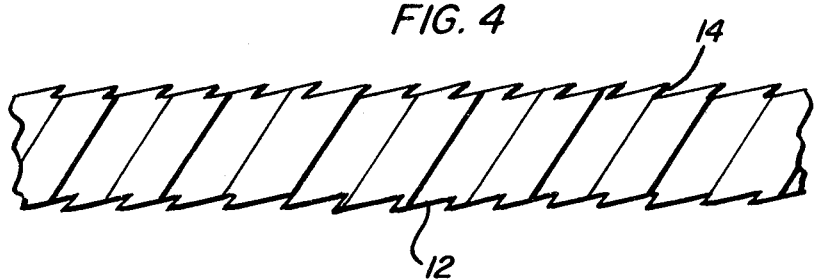
FIG. 4 is an enlarged and fragmentary view of a nylon cord according to the present invention.

Referring now to the drawings there is shown a frictional saw 10 for cutting or sawing a plastic a PVC pipe 11 that is either solid or hollow. The friction saw 10 includes a length of Nylon cord, line, twine or string formed of several filaments into a composite helical cable 12 as shown in FIG. 4 presenting a cutting surface 14. Ends of the cord 12 are knotted and tied at 16 and 18, each abutting a washer 24 or 26 at the ends of handles 20 and 22.

Figure 3:
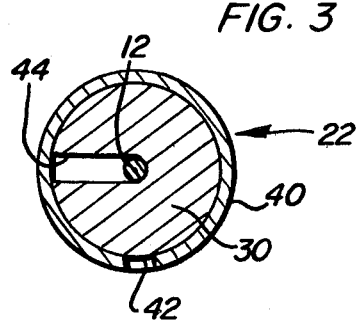
FIG. 3 is a sectional view taken along section line 3—3 of FIG. 1.

The handle 22 is releasably anchored to the cord 12 and is constructed of a cylindrical body 30 with portions 32 and 34 at each end for retaining a hollow sleeve 40 made of a resilient material. The sleeve 40 is split at 42 as shown in FIG. 3 so as to act as a removable locking clip enabling easy removal of the handle 22 from line 12 by radial withdrawal of line 12 through slot 44 upon removal of the sleeve. The body 30 has a longitudinal slot 44 through which Nylon cord may be assembled into the handle 22 before the sleeve 40 is applied.

Figure 1:
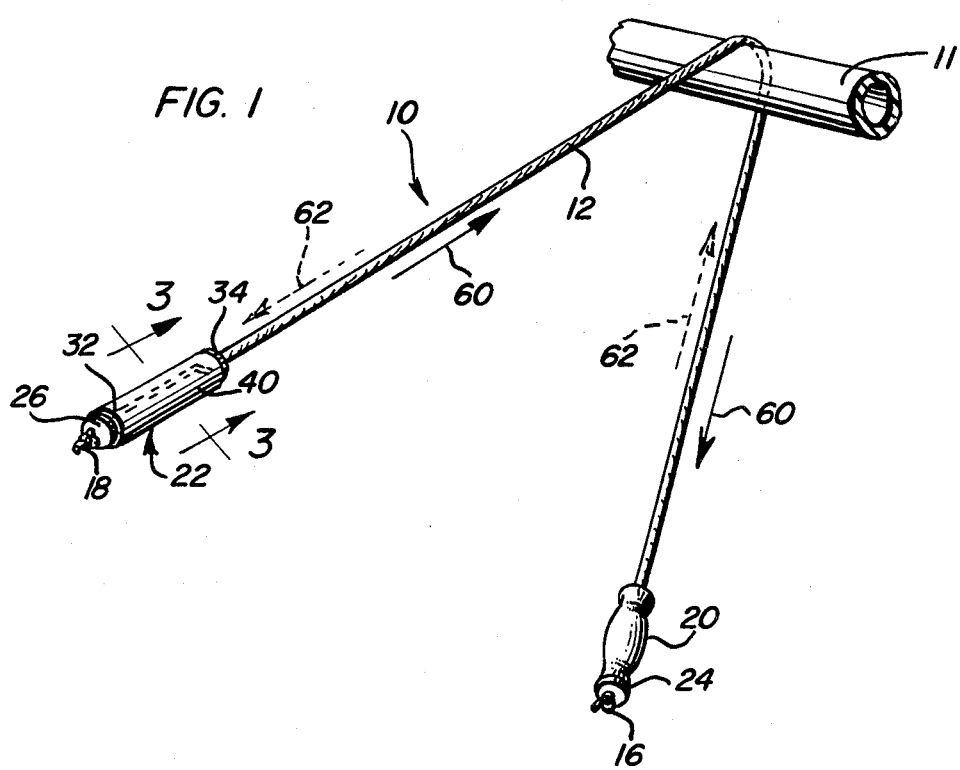
FIG. 1 is a perspective view of a friction saw according to the present invention and showing the saw for cutting a plastic body or PVC pipe.
Figure 2:
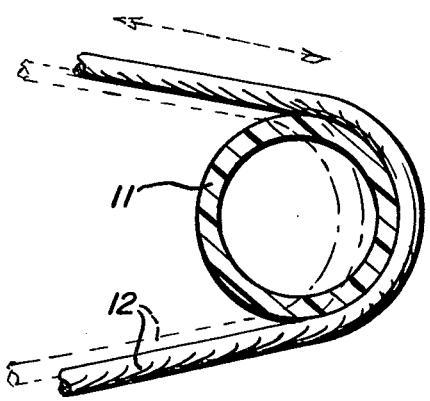
FIG. 2 is an enlarged and sectional view of the plastic pipe being cut by the nylon cord.

The frictional saw 10 may have one or both of the handles constructed in the manner described with respect to handle 22 as shown in FIGS. 1 and 3. The advantage of such construction is to enable disassembly of the handle from the Nylon cord when the handle will not fit over, behind or around the object or pipe 11 to be cut. The Nylon cord may then be threaded around the pipe 11 to be cut, and the handle 22 reassembled onto the Nylon cord as described. The pipe 11 may then be cut by drawing or pulling the cord 12 as shown by the arrows 60 until the handle 22 approaches the pipe 11, whereupon movement of the frictional saw is reversed in direction as shown by the dotted line arrow 62 of FIG. 1. Such reciprocating movement is continued until the plastic pipe 11 is severed. In this way, the Nylon cord is prevented from slipping out of the slotted handle 22 and the cord 12 is retained centrally or axially within the slot 44 of the body 30.

By repetitive, back and forth, reciprocation of the Nylon cord, the plastic material or pipe 11 is cut without any blade binding or other disadvantages normally associated with inaccessible locations. The frictional saw is used to cut PVC plastic articles as long as the plastic article or pipe 11 is held in semi-rigid position at its location. The location may be rendered inaccessible because of a tight corner or a ditch by way of example. The frictional saw has the effect of performing as a blade very quickly and producing an even cut generally perpendicular to the pipe 11.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A light weight flexible saw comprising a textile cord having a generally abrasive external surface between longitudinally opposite knotted ends, and handle elements on the textile cord in abutment with said knotted ends, said textile cord being made of Nylon filaments capable of cutting thermosetting plastic materials in frictional contact therewith by sawing, the textile cord being reciprocated as a saw blade by means of the handle element, at least one of the handle elements having a molded elongated body having a radial slot therein through which the textile cord is received in spaced relation to the knotted ends, said one of the handle elements including a resilient clip enclosing the elongated body to prevent disassembly of the textile cord through the radial slot.

2. A tool for cutting an object, including an elongated flexible line having longitudinally opposite end portions and formed from filaments presenting an outer frictional cutting surface with respect to said object, said line being adapted to frictionally contact a relatively inaccessible portion of the object from which the line extends in generally opposite directions toward the end portions, handle means in abutment with the end portions for transmitting pulling forces to the line in said opposite directions, and means independent of the end portions for enabling removal of at least one of the handle means from the line to permit threading thereof about the object into frictional contact with said inaccessible portion, said one of the handle means including a body through which the line extends from one of the end portions and a retainer fitted about the body, the removal enabling means including a slot in the body through which the line is radially withdrawn upon disassembly of the retainer.

3. A tool for cutting a thermosetting plastic object, including an elongated flexible line having longitudinally opposite knotted ends and formed from helical Nylon filaments presenting an outer frictional cutting surface with respect to a thermosetting plastic, said line being adapted to frictionally contact a relatively inaccessible portion of the plastic object from which the line extends in generally opposite directions toward the knotted ends, handle means in abutment with the knotted ends for transmitting pulling forces to the line in said opposite directions, and means independent of the knotted ends for enabling removal of at least one of the handle means from the line to permit threading thereof about the plastic object into frictional contact with said incessible portion, said one of the handle means including an elongated body through which the line extends from one of the knotted ends, a retainer sleeve fitted about said elongated body and a washer at one axial end of the elongated body between the knotted end and the retainer sleeve, the removal enabling means comprising a slit in the retainer sleeve and a longitudinal slot in the elongated body through which the line is radially withdrawn upon disassembly of the sleeve.

* * * * *